United States Patent
Wenzhen et al.

(10) Patent No.: US 7,769,095 B2
(45) Date of Patent: Aug. 3, 2010

(54) APPARATUS, A RECEIVER AND A METHOD FOR TIMING RECOVERY IN AN OFDM SYSTEM

(75) Inventors: Li Wenzhen, Singapore (SG); Tomisawa Masayuki, Singapore (SG)

(73) Assignee: Oki Techno Centre (Singapore) Pte Ltd, Singapore (SG)

( * ) Notice: Subject to any disclaimer, the term of this patent is extended or adjusted under 35 U.S.C. 154(b) by 530 days.

(21) Appl. No.: 11/836,133

(22) Filed: Aug. 8, 2007

(65) Prior Publication Data

US 2008/0069252 A1    Mar. 20, 2008

(30) Foreign Application Priority Data

Sep. 12, 2006    (SG) ............................. 200606234

(51) Int. Cl.
H04K 1/10    (2006.01)
H04L 27/28    (2006.01)

(52) U.S. Cl. .................. 375/260; 375/371; 375/373; 375/376; 327/147; 327/156

(58) Field of Classification Search ............ 375/260, 375/371–376; 370/203–211; 327/147–163
See application file for complete search history.

(56) References Cited

U.S. PATENT DOCUMENTS

2006/0215778 A1 *    9/2006    Murthy et al. ............... 375/260

* cited by examiner

Primary Examiner—Curtis B Odom
(74) Attorney, Agent, or Firm—Rabin & Berdo, P.C.

(57) ABSTRACT

An apparatus for timing recovery in an OFDM system comprises a third order phase lock loop comprising a Fast Fourier Transform stage for receiving a number of input signals in the time domain and transforming the signals to the frequency domain. A phase rotation stage adjusts the phase of one or more of the transformed signals. A frequency offset estimation stage estimates frequency offset between sampled signals and a first accumulator accumulates the frequency offset estimates. A low pass filter couplable to an output of the first accumulator stabilizes the phase lock loop. A second accumulator accumulates outputs of the low pass filter and controls phase rotation in the phase rotation stage. A controller controls timing associated with the window of operation of the Fast Fourier Transform process and is itself controlled by the second accumulator. There is also disclosed a receiver comprising the above apparatus and a method for timing recovery in an OFDM system.

9 Claims, 11 Drawing Sheets

APPARATUS, A RECEIVER AND A METHOD FOR TIMING RECOVERY IN AN OFDM SYSTEM

BACKGROUND OF THE INVENTION

1. Field of the Invention

The present invention relates to an apparatus, a receiver and a method for timing recovery in an orthogonal frequency division multiplexing (OFDM) system, and particularly for sampling timing recovery implementation in a multiple input multiple output OFDM (MIMO-OFDM) system for wireless communications.

2. Description of Related Art

MIMO-OFDM technology is extensively employed in IEEE802.11n based high-speed Wireless Local Access Networks (WLAN), mobile systems with Worldwide Interoperability for Microwave Access (WiMAX), and Digital Video Broadcasting (DVB) systems. It is well known that OFDM is robust in frequency selective fading channels with a relatively low implementation cost and high bandwidth efficiency. Moreover, MIMO takes advantage of multipath propagation to increase throughput, range/coverage, and reliability. By transmitting multiple signals containing different information streams over the same frequency channel, MIMO provides a means of doubling or tripling spectral efficiency. The combination of MIMO and OFDM techniques provides low-cost implementation particularly for high data rate communications.

However, OFDM is known to be vulnerable to synchronization errors, which can cause inter-carrier interference (ICI) and degrade system performance. In MIMO-OFDM transmission systems, the synchronization tasks include carrier frequency synchronization and timing recovery, and timing recovery can be further divided into symbol synchronization and sampling clock synchronization. Symbol synchronization finds the correct position of the Fast Fourier Transform (FFT) window with the aid of the dedicated training symbols. The purpose of sampling clock synchronization is to align the sampling clock frequency of the receiver to that of the transmitter, that is, to compensate the sampling phase drift between the transmitter and the receiver.

There exist many publications dealing with timing recovery for OFDM or MIMO-OFDM receivers. Examples of these are:

[1]. Hlaing Minn, Vijay K. Bhargava, and Khaled Ben Letaief, "A Robust Timing and Frequency Synchronization for OFDM Systems", IEEE Trans. On Wireless Comm., Vol. 2, No. 4, July 2003, pp. 822-839.

[2]. Michael Speth, Stefan A. Fechtel, Gunnar Pock, and Heinrich Meyr, "Optimum Receiver Design for Wireless Broadband Systems Using OFDM-Part I", IEEE Trans. On Comm. Vol. 47, No. 11, November 1999, pp. 1668-1677.

[3]. Nguyen Duc Long and Hyuncheol Park, "Joint Fine Time Synchronization and Channel Estimation for MIMO-OFDM WLAN", IEEE Proc. of Intelligent Signal Processing and Communication Systems, ISPACS 2004, 18-19, November 2004, pp. 463-467.

[4]. Seok Ho Won, Deuk-Su Lyu, and Hyeong Jun Park, "Physical Layer Implementation and Evaluation of Multiple Input Multiple Output-Orthogonal Frequency Division Multiplexing (MIMO-OFDM) system", IEEE Proc. International Conference on Communication Technology, ICCT 2003, Vol. 2, Apr. 9-11, 2003, pp. 1348-1352.

[5]. Chi-Yeh Yu, Zih-Yin Ding, and Tzi-Dar Chiueh, "Design and Simulation of a MIMO OFDM Baseband Transceiver for High Throughput Wireless LAN', IEEE Proc. of 2004 Asia-Pacific Conference on Circuit and Systems. Dec. 6-9, 2004, pp. 205-208.

[6]. Aliert van Zelst and Tim C. W. Schenk, "Implementation of a MIMO OFDM-Based Wireless LAN System", IEEE Trans. on Signal processing, Vol. 52, No. 2, February 2004, pp. 483-494.

[7]. Shou-Yin Liu and Jong-Wha Chong, "A Study of Joint Tracking Algorithms of Carrier Frequency Offset and Sampling Clock Offset for OFDM-based WLANs," IEEE Proc. of Communications, Circuits and Systems and West Sino Expositions, Vol. 1, Jun. 29-Jul. 1, 2002, pp. 109-113.

[8]. Baoguo Yang, Khaled Ben Letaief, Roger S. Cheng, and Zhigang Cao, "Timing Recovery for OFDM Transmission", IEEE Journal of Selected Areas in Communications, Vol. 18, No. 11, November, 2000, pp. 2278-2291.

[9]. Pei-yun Tsai, Hsin-Yu Kang and Tzi-Dar Chiueh, "Joint Weighted Least Squares Estimation of Frequency and Timing Offset for OFDM Systems over Fading Channels", IEEE Trans. on Vehicular Technology, Vol. 54, Issue 1, January 2005, pp. 211-223.

However, a majority of the work addressing the problems in quickly acquiring the varying sampling phase and stably tracking the timing drift with a low complexity actually focus on symbol synchronization [see for example the publications by Hlaing Minn, Vijay K. Bhargava, and Khaled Ben Letaief, entitled "A Robust Timing and Frequency Synchronization for OFDM Systems", published as IEEE Trans. on Wireless Comm., Vol. 2, No. 4, July 2003, pp. 822-839, and Michael Speth, Stefan A. Fechtel, Gunnar Pock, and Heinrich Meyr, entitled "Optimum Receiver Design for Wireless Broadband Systems Using OFDM-Part 1", published as IEEE Trans. on Comm. Vol. 47, No. 11, November 1999, pp. 1668-1677.

Many sampling frequency offset estimation algorithms jointly with carrier frequency offset estimation only address the timing error estimation instead of recovery [see for example publications [3] to [7] mentioned above], and few works lend themselves efficiently to integrated circuit implementations suitable for low cost WLAN products.

A non-coherent delay-locked loop based sampling clock recovery scheme is proposed in the publication by Baoguo Yang, Khaled Ben Letaief, Roger S. Cheng, and Zhigang Cao, entitled "Timing Recovery for OFDM Transmission", published in the IEEE Journal of Selected Areas in Communications, Vol. 18, No. 11, November, 2000, pp. 2278-2291. The scheme described in this publication improves the mean square error performance compared to the commonly known correlation methods, and refers to tracking the timing drifting caused by the sampling frequency offsets. However, its acquisition is slow and tracking performance is poor particularly in low SNR and multipath fading channels due to its coarse phase discrimination algorithm.

A jointly weighted least squares estimation of carrier frequency offset and sampling frequency offset in OFDM systems is proposed in the publication by Pei-yun Tsai, Hsin-Yu Kang and Tzi-Dar Chiueh, entitled "Joint Weighted Least Squares Estimation of Frequency and Timing Offset for OFDM Systems over Fading Channels", published in the IEEE Trans. on Vehicular Technology, Vol. 54, Issue 1, January 2005, pp. 211-223. Although this algorithm derives the optimal weight factors and can achieve near the Cramer-Rao low bound in the variance of estimation errors, its complexity is very high and it may not be suitable for practical application. Moreover, its accurate estimation is not integrated with an efficient PLL implementation, and, therefore, its acquisition and tracking performance are not promising due to the high dynamics in the estimator output or the loop filter input.

Thus, there is a need for a system and method which can ameliorate or substantially overcome the abovementioned disadvantages.

SUMMARY OF THE INVENTION

In general terms, the present invention provides an apparatus and method for timing recovery in an OFDM system, such as a MIMO-OFDM system, comprising a third order phase lock loop and a two-dimensional maximum likelihood estimator as a timing offset discriminator.

According to a first aspect of the present invention there is provided an apparatus for timing recovery in an OFDM system comprising:
  a third order phase lock loop (PLL) comprising:
  a Fast Fourier Transform (FFT) stage for receiving a number of input signals in the time domain and transforming one or more of the number of input signals to the frequency domain; one or more of the number of input signals having an associated sampling frequency and phase and comprising a number of symbols, the Fast Fourier Transform stage being arranged to apply a Fast Fourier Transform process to one or more of the number of input signals, the Fast Fourier transform process having an associated window of operation;
  a phase rotation stage couplable to an output of the Fast Fourier Transform stage for adjusting the phase of one or more of the one or more transformed signals;
  a frequency offset estimation stage couplable to an output of the phase rotation stage for estimating frequency offset between sampled signals to provide one or more frequency offset estimates;
  a first accumulator couplable to an output of the frequency offset estimation stage for accumulating the one or more frequency offset estimates;
  a low pass filter couplable to an output of the first accumulator for stabilizing the phase lock loop;
  a second accumulator couplable to an output of the low pass filter for accumulating outputs of the low pass filter; the second accumulator being arranged to control phase rotation in the phase rotation stage; and
  a controller stage for controlling timing associated with the window of operation of the Fast Fourier Transform process applied by the Fast Fourier Transform stage, the second accumulator being arranged to control the controller stage;
  the phase rotation being arranged to generate a time recovered output signal.

In a first preferred embodiment, the frequency offset estimation stage comprises:
  one or more cross-correlation stages for correlating one or more outputs from the one or more phase rotation stages and for providing one or more cross-correlated output signals;
  one or more first summation stages for summing the cross-correlated output signals in each antenna channel;
  a second summation stage for summing the one or more outputs of the one or more first summation stages;
  a further stage for determining an average phase difference between consecutive symbols from an output signal of the second summation stage; and
  a phase extraction stage couplable to an output of said further stage for extracting the phase of the one or more cross-correlated output signals and to generate an estimated sampling frequency offset.

In a second preferred embodiment, the apparatus further comprises a MIMO detection stage couplable between the one or more phase rotation stages and the cross-correlation stages in the frequency offset estimation stage.

According to a second aspect of the present invention there is provided a method of timing recovery in an OFDM system comprising:
  applying in a Fast Fourier Transform stage a Fast Fourier Transform process to a number of received input signals in the time domain to transform one or more of the number of input signals to the frequency domain, one or more of the number of input signals having an associated sampling frequency and phase and comprising a number of symbols, the Fast Fourier transform process having an associated window of operation;
  adjusting the phase of one or more of the one or more transformed signals in a phase rotation stage couplable to an output of the Fast Fourier Transform stage;
  estimating in a frequency offset estimation stage frequency offset between sampled signals to provide one or more frequency offset estimates from an output signal of the phase rotation stage;
  accumulating the one or more frequency offset estimates in a first accumulator;
  stabilizing the phase lock loop using a low pass filter;
  accumulating outputs of the low pass filter in a second accumulator;
  controlling the phase rotation in the phase rotation stage using the accumulated outputs of the low pass filter; and
  controlling timing associated with the window of operation of the Fast Fourier Transform process applied by the Fast Fourier Transform stage using the accumulated outputs of the low pass filter.

Preferably, the step of estimating the frequency offset comprises:
  correlating one or more output signals from the one or more phase rotation stages and for providing one or more cross-correlated output signals;
  summing in one or more first summation stages the cross-correlated output signals for each antenna;
  summing in a second summation stage one or more outputs of the one or more first summation stages and providing an output signal;
  determining an average phase difference between consecutive symbols from an output signal from the second summation stage; and
  extracting the phase of the one or more cross-correlated output signals to generate an estimated sampling frequency offset.

In a further preferred embodiment, the method further comprises applying the one or more outputs of the one or more phase rotation stages to one or more inputs of a MIMO detection stage prior to the step of correlating the signals in the frequency offset estimation stage.

According to a third aspect of the present invention there is provided a receiver comprising the apparatus for timing recovery in an OFDM system defined above.

One or more preferred embodiments of the present invention comprising the third-order PLL with a two-dimensional maximum likelihood (ML) estimator as its sampling offset discriminator are particularly advantageous in timing recovery for MIMO-OFDM based WLAN systems. In particular, one or more preferred embodiments are both accurate and of lower complexity and cost than conventional systems and methods. Moreover, the third-order PLL structure assists in providing good loop noise performance to assist in the achievement of both fast acquisition and stable tracking.

BRIEF DESCRIPTION OF THE DRAWINGS

The present invention will now be described by way of example and with reference to the drawings in which.

DETAILED DESCRIPTION OF THE INVENTION

Figure 1:
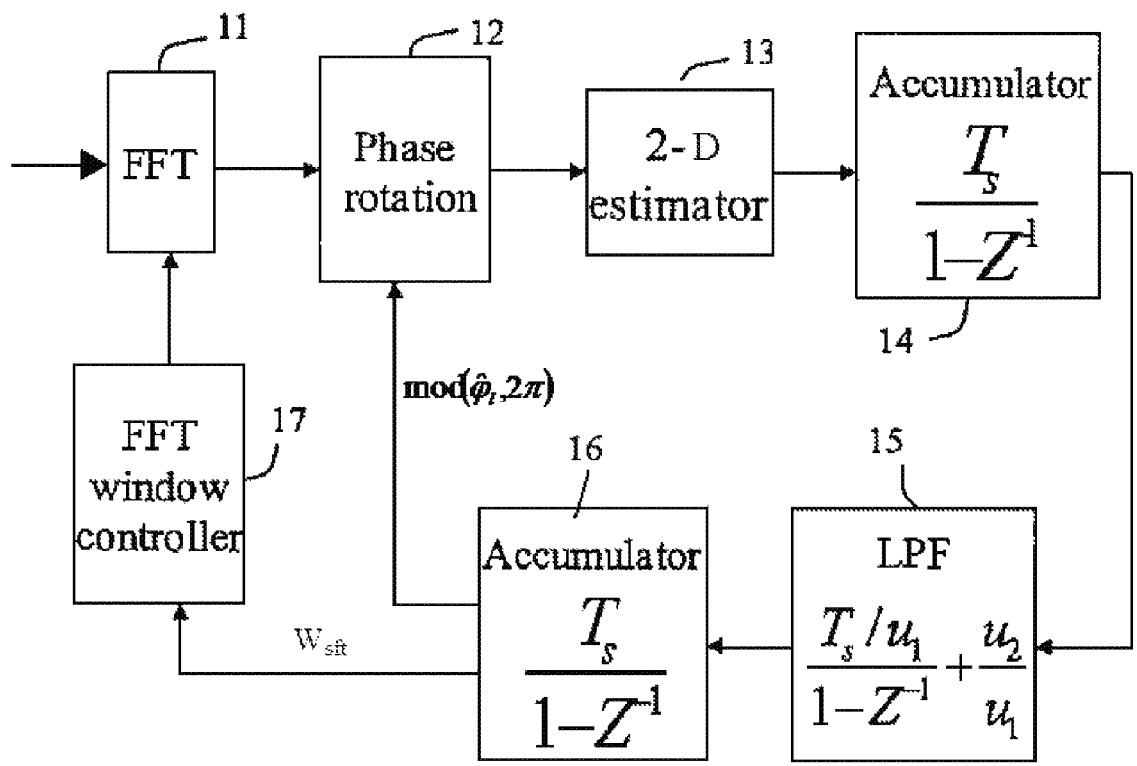
FIG. 1 is a block diagram of a third order phase lock loop (PLL) for recovering timing in a sampling system according to a preferred embodiment of the invention.

FIG. 1 shows a timing recovery apparatus for a MIMO-OFDM system according to a first preferred embodiment of the present invention. The apparatus comprises a Fast Fourier Transform (FFT) stage 11 for receiving an input signal and for converting the input signal into the frequency domain. The output of the FFT stage 11 is applied to an input of a phase rotation stage 12, the output of which is applied to an input of a two-dimensional sampling frequency offset estimator 13. The output of the two-dimensional sampling frequency offset estimator 13 is applied to the input of a first accumulator 14 and the output thereof is applied to the input of a low pass filter 15. The output of the low pass filter 15 is applied to the input of a second accumulator 16. A first output of the second accumulator 16 is applied to a further input of the phase rotation stage 12 and a second output of the second accumulator 16 is applied to an input of a FFT window controller 17. The output of the FFT window controller 17 is applied to a further input of the FFT stage 11. The first and second accumulators 14 and 16 and the low pass filter 15 form a third order phase lock loop (PLL).

Figure 2:
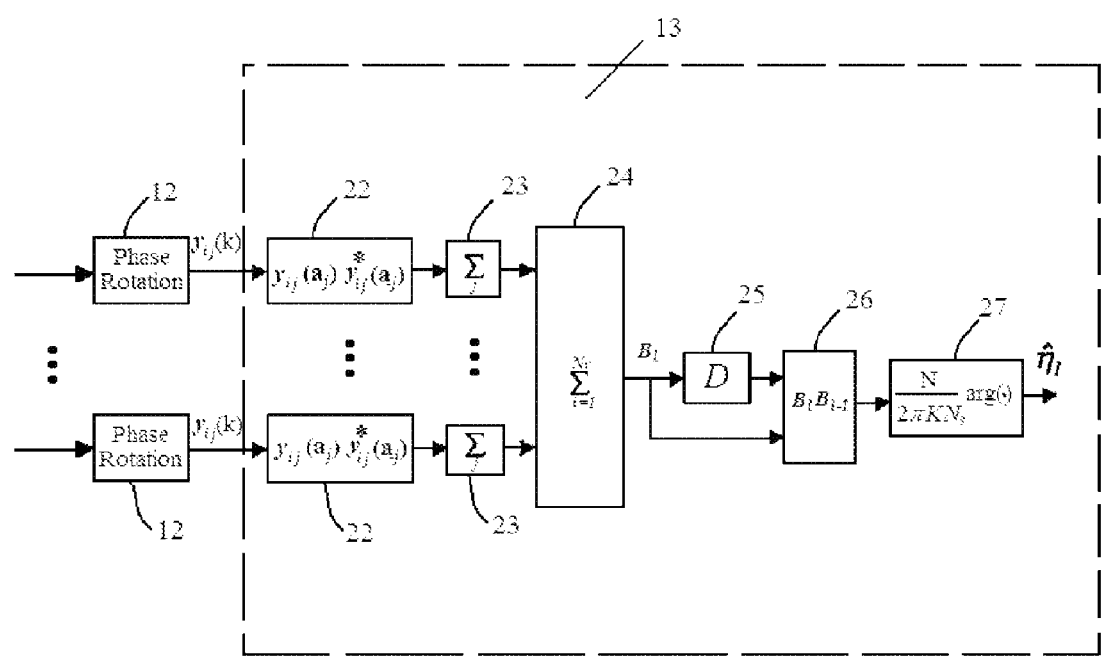
FIG. 2 is a block diagram of a two dimensional sampling frequency offset estimator for use in the third order phase lock loop of FIG. 1.

FIG. 2 shows the components of a first embodiment of the two-dimensional sampling frequency offset estimator 13 for use in the system of FIG. 1 according to a first preferred embodiment of the invention. The two-dimensional sampling frequency offset estimator 13 may comprise, for each subcarrier, an phase rotation stage 12 for receiving the output of the FFT stage 11 of FIG. 1, the output of the phase rotation stage 12 being applied to the input of a cross-correlation stage 22. After cross-correlation, the output of the cross-correlation stage 22 is applied to the input of a first summation stage 23. The outputs of the first summation stages 23 for each subcarrier are then applied to respective inputs of a second summation stage 24. The output of the second summation stage 24 is applied to both the input of an OFDM symbol delay stage 25 and a first input of a stage 26 for determining the phase difference between consecutive symbols. The output of the OFDM delay stage 25 is applied to a second input of the stage 26 for determining the phase difference between consecutive symbols and the output of the stage 26 is applied to the input of a phase extraction stage 27. The two-dimensional sampling frequency offset estimator 13 shown in FIG. 2 is particularly suitable for use in MIMO-OFDM based WLAN systems.

Figure 3:
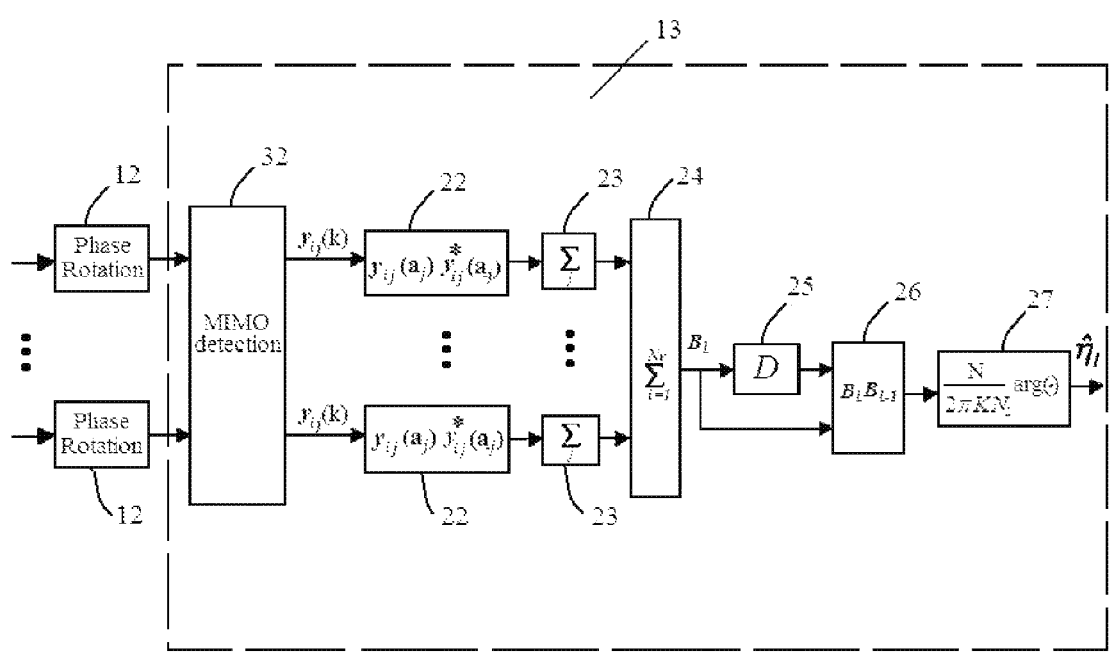
FIG. 3 is a block diagram of an alternative two dimensional sampling frequency offset estimator for use in the embodiment of FIG. 1.

FIG. 3 is an alternative two dimensional estimation stage to that shown in FIG. 2 according to a further preferred embodiment of the invention. The same reference numerals have been applied to identical components in the two stages. The sole difference between the stages shown in FIGS. 2 and 3 is that in the embodiment of FIG. 3, a MIMO detector stage 32 is included to receive the outputs of the phase rotation stages 12 for each subcarrier and the outputs of the MIMO detector stage 32 for each subcarrier are applied to an input of the respective cross-correlation stages 22.

In operation, after coarse symbol synchronization is performed in the time domain in a MIMO-OFDM system, the symbol timing is assumed to be strictly synchronized for a first OFDM symbol. The timing recovery system and method according to preferred embodiments of the present invention starts its function in the frequency domain after FFT in the FFT stage 11, as shown in FIG. 1. In the timing recovery stage, there are two operations, namely, timing estimation and timing adjustment. For the timing adjustment, a two dimensional timing frequency offset estimator 13 such as that shown in FIG. 2 or 3 may be used to estimate the frequency offset. After the frequency offset has been estimated in the frequency offset estimator 13, a third-order PLL comprising stages 14 to 16 tracks the varied timing phase for every OFDM symbol. The tracked timing estimation outputs are divided into an integer part and a fractional part. The integer part is used to adjust the symbol timing in the FFT window controller 17 which moves the window position forward or backward for each sample. At the same time, the fractional part is used for sampling clock adjustment which may be performed in the discrete-time domain by phase rotation in stage 12 of every subcarrier for each OFDM symbol.

The third-order PLL in FIG. 1 comprising the stages 14 to 16, has an excellent loop noise performance for both achieving fast acquisition and stable tracking and solves the problems often associated with conventional systems which tend to exhibit slow acquisition and poor tracking.

In the two dimensional timing frequency offset estimator 13 according to the preferred embodiment shown in FIG. 2, the signal output from the phase rotation stages 12 are applied to the input of the cross-correlation stages 22 as shown in FIG. 2. Cross-correlations are performed in the cross-correlation stages 22 between received positive and negative subcarrier pairs $a_m$ and $a_{-m}$ in an OFDM symbol. The cross-correlation values are then summed in the frequency domain through all positive and negative subcarrier sets in the first summation stages 23, and are further accumulated in the spatial domain in the second summation stage 24 over all received antennae signals. The averaged phase difference between two consecutive OFDM symbols at the receiver is computed in the stage 26 by cross-correlating the outputs of the second summation stage 24 with the previous outputs of the second summation stage 24 delayed in the OFDM symbol delay stage 25. The second-tier cross-correlation output from the stage 26 is applied to a phase extraction stage 27 to obtain the estimated sampling frequency offset. The output of phase extraction stage 27 is applied to the third-order PLL comprising stages 14 to 16 of FIG. 1 which tracks the varied timing phase for every OFDM symbol.

In the two dimensional timing frequency offset estimator 13 according to an alternative preferred embodiment shown in FIG. 3, the signal output from the phase rotation stage 12 in FIG. 1, is applied to a MIMO detection stage 32 and then to respective cross-correlation stages 22 in which cross-correlation is performed between received positive and negative subcarrier pairs $a_m$ and $a_{-m}$ in an OFDM symbol. The cross-correlation values are then summed in the frequency domain through all positive and negative subcarrier sets in the first summation stages 23, and are further accumulated in the spatial domain in the second summation stage 24 over all received antennae signals. The averaged phase difference between two consecutive OFDM symbols at the receiver is computed in the stage 26 by cross-correlating the outputs of the second summation stage 24 with the previous outputs of the second summation stage 24 delayed in the OFDM symbol delay stage 25. The second-tier cross-correlation output from the stage 26 is applied to a phase extraction stage 27 to obtain the estimated sampling frequency offset. The output of phase extraction stage 27 is applied to the third-order PLL comprising stages 14 to 16 of FIG. 1 which tracks the varied timing phase for every OFDM symbol. The offset estimator of FIG. 3 is particularly advantageous as it has improved anti-fading capabilities and better accuracy in a MIMO-fading channel over the system shown in FIG. 2.

The processing of the signals in the structures shown in FIGS. 1 to 3 may be explained as follows. In a MIMO-OFDM based WLAN system, the transceiver signals may be expressed in the frequency domain using relatively straightforward matrix algebra. Considering a $N_r \times N_t$ MIMO-OFDM system, where $N_t$ and $N_r$ are the numbers of transmitter and receiver antennae respectively, the $N_r \times 1$ received signal vector on the k-th subcarrier may be written as:

$$y(k) = H(k)x(k) + n(k). \quad (1)$$

Here $y(k)=(y_1(k), y_2(k), \ldots, y_{N_r}(k))^T$, and $x(k)$ is the $N_t \times 1$ signal vector transmitted from $N_t$ transmitter antennae on the k-th subcarrier, which may be written as $$x(k)=(x_1(k), x_2(k), \ldots, x_{N_t}(k))^T$$

The channel frequency response of the k-th subcarrier from the j-th transmitter antenna to the i-th receiver antenna may be denoted by $H_{i,j}(k)$, and $$H(k) = \begin{pmatrix} H_{1,1}(k) & H_{1,2}(k) & \ldots & H_{1,N_t}(k) \\ H_{2,1}(k) & H_{2,2}(k) & \ldots & H_{2,N_t}(k) \\ \vdots & \vdots & \ldots & \vdots \\ H_{N_r,1}(k) & H_{N_r,2}(k) & \ldots & H_{N_r,N_t}(k) \end{pmatrix}.$$

$n(k)=(n_1(k), n_2(k), \ldots, n_{N_r}(k))^T$ is the spatially independent Gaussian noise vector for multiple receiver chains.

In the above system model, ideal synchronization in the OFDM receiver has been assumed. However, there is usually a carrier frequency offset between the receiver and transmitter due to the mismatch between the transmitter and receiver oscillators or the channel Doppler frequency shift. This is true also for the receiver sampling clock. There is also usually a sampling frequency offset between transmitter and receiver side.

In the receiver, the carrier frequency may be denoted by f', and the sampling clock by T'. Therefore the carrier frequency offset, $\Delta f$, and the relative sampling clock offset, $\eta$, may be respectively designated as $\Delta f = f - f'$ and $\eta = (T'-T)/T$, where T is the nominal sampling period.

In practice, there are multiple radio chains for MIMO-OFDM transmitter and receiver sides respectively, and these multiple radio chains share the same frequency synthesizer such that multiple radio chains in the transmitter and receiver are synchronized respectively. Thus, the above definition for carrier frequency offset and sampling frequency offset are applicable both for OFDM systems and MIMO-OFDM systems. Following the system analysis method in publication [9] mentioned above, the MIMO-OFDM system model suffering a synchronization error may be derived as shown below.

It is assumed that the information signals are encoded and modulated to form an OFDM symbol $x_l(k)$ in the frequency domain. After IFFT transformation and pass-band modulation, the time-domain transmitted signals pass through a MIMO fading channel. The l-th received baseband OFDM symbol after sampling with sampling clock T', and removing the guard interval, may be represented by N samples. The demodulation of the received samples via an N-point FFT yields the received OFDM symbols in the frequency domain $$y_l(k) = \exp(j2\pi\Delta f(lN_s + N_g)(1+\eta)T + \varphi_l) \quad (2)$$
$$\exp\left(j\frac{2\pi k(lN_s + N_g)\eta}{N}\right)H(k)x_l(k)s(\pi\phi_{kk}) + ICI_l(k) + n_l(k)$$

where $\phi_l$ is phase noise; T and N are the sample duration and the number of FFT points respectively; $N_g$ and $N_s$, are samples in the guard interval and the whole OFDM symbol including guard interval respectively. The distortion of the k-th subcarrier data caused by synchronization error includes phase rotation and the magnitude scaling, $s(\pi\phi_{kk})$, respectively. Moreover, the synchronization error destroys the orthogonality between subcarriers resulting in ICI, which is the function of $s(\pi\phi_{pk})$. As set out in publication [9] mentioned above, the definition of $s(\pi\phi_{pk})$ may be expressed as:

$$s(\pi\phi_{pk}) = \frac{\sin(\pi\phi_{pk})}{N \sin\left(\frac{\pi\phi_{pk}}{N}\right)}, \text{ and}$$

$s(\pi\phi_{kk}) = s(\pi\phi_{pk})$ in the case of p=k, where p and k are subcarrier indexes and $\phi_{pk}=(1+\eta)(\epsilon+p)-k$, $\epsilon=\Delta f \cdot T$.

The synchronization error causing distortion of the k-th subcarrier data includes phase rotation and magnitude scaling respectively. Moreover, the synchronization error destroys the orthogonality between subcarriers resulting in ICI. When $\eta$ and $\epsilon$ are small, $s(\pi\phi_{kk})$ is close to 1 and $s(\pi\phi_{pk})$ is near zero, and the magnitude distortion and the ICI term may be ignored. Thus, a phase rotation occurs when the subcarrier sample $x_l(k)$ is transmitted. The rotated phase is such that $$\varphi_l(k) = 2\pi\Delta f (lN_s + N_g)(1+\eta)T + \frac{2\pi k}{N}(lN_s + N_g)\eta \quad (3)$$

The first component is the inter-play of carrier and sampling frequency offsets, and the second component is contributed by sampling frequency offset exclusively.

In the cases when only timing frequency offset exists, the phase rotation is proportional to the subcarrier index as well as the symbol index.

In general, to obtain a precise timing in a wide range, the synchronization process usually includes two steps, coarse synchronization and fine synchronization. In one or more preferred embodiments of the present invention, focus is concentrated on the tracking and recovery of the timing drifting due to sampling frequency offset. A conventional correlation based coarse symbol synchronization algorithm may be implemented with the aid of the dedicated training symbols to locate the initial FFT window position and examples of conventional correlation are described in the publications by Hlaing Minn, Vijay K. Bhargava, and Khaled Ben Letaief, entitled "A Robust Timing and Frequency Synchronization for OFDM Systems", published as IEEE Trans. On Wireless Comm., Vol. 2, No. 4, July 2003, pp. 822-839, and Michael Speth, Stefan A. Fechtel, Gunnar Pock, and Heinrich Meyr, entitled "Optimum Receiver Design for Wireless Broadband Systems Using OFDM-Part 1", published as IEEE Trans. On Comm. Vol. 47, No. 11, November 1999, pp. 1668-1677.

Moreover, various conventional carrier frequency synchronization methods such as those described in the publications numbered [3] to [7] listed above may be easily combined in the implementations of preferred embodiments of the present invention.

When there is a sampling clock frequency offset between the transmitter and the receiver, the symbol timing error will be linearly increased or decreased. Feedback techniques based on PLL (phase lock loop) structures have a better tracking ability to track slowly varying parameter changes automatically, which is a good solution for tracking the timing drift due to sampling frequency offsets.

To derive the two dimensional sampling frequency offset estimation for MIMO-OFDM based WLAN systems according to the embodiment shown in FIG. 2, it may be assumed that 2J pilots are inserted among N subcarriers and that these pilot subcarrier indices may be denoted by $a_m$, m=−1, . . . , −J, 1, 2, . . . J. The two-dimensional estimator of FIG. 2 is based on the fact that timing offset in the time domain results in phase offset in the frequency domain and this phase offset is proportional to the sub-carrier frequency as shown in Equation (3). The estimation derived by the estimator of FIG. 2 may be represented as Equation (4).

$$z_l = \arg\left(\sum_{i=1}^{N_r}\sum_{j=1}^{J} y_{l,i}(a_j)y_{l,i}^*(a_{-j})\left[\sum_{i=1}^{N_r}\sum_{j=1}^{J} y_{l-1,i}(a_j)y_{l-1,i}^*(a_{-j})\right]^*\right) \quad (4)$$

$$= \arg\left(\left|\sum_{i=1}^{N_r}\sum_{m=1}^{J}\left(\sum_{j=1}^{N_t} H_{i,j}(a_m)x(a_m)\left[\sum_{j=1}^{N_t} H_{i,j}(a_{-m})x(a_{-m})\right]^*\right)\right|^2 + e_l\right)$$

$$= \frac{2\pi K N_s \eta}{N} + \xi_l$$

where the frequency domain channel response $H_{i,j}(k)$ and the pilot subcarrier $x(a_m)$ are commonly applied for every OFDM symbol. Namely $H_{l,i,j}(k)=H_{l-1,i,j}(k)=H_{i,j}(k)$, and $x_{l-1}(a_m)=x_l(a_m)=x(a_m)$.

In Equation (4), arg(*) is the phase of its argument and the summation is carried out over all pilot subcarriers and over multiple receiver antennae for averaging. $e_l$ and $\xi_l$ take into account all contributions from noise in the estimator for the MIMO-OFDM system. It should also be noted that the index distance for each pair of pilot subcarriers is equal to K. The derived variable is a linear function of the sampling frequency offset with a constant scaling factor. Thus, an ML timing error estimator independent of carrier frequency offset, subcarrier index, and symbol index may be efficiently derived based on the two-dimensional estimator shown in FIG. 2. This estimated timing offset may be denoted by, $$\hat{\eta}_l = \frac{z_l N}{2\pi K N_s} = \eta + \frac{\xi_l N}{2\pi K N_s} \quad (5)$$

where the first component is the useful component and the second is a zero-mean disturbance.

The ML estimation performed by the system of FIG. 2 has similar accuracy to that achieved by implementation of the algorithm described in the publication by Pei-yun Tsai, Hsin-Yu Kang and Tzi-Dar Chiueh, entitled "Joint Weighted Least Squares Estimation of Frequency and Timing Offset for OFDM Systems over Fading Channels", published as IEEE Trans. On Vehicular Technology, Vol. 54, Issue 1, January 2005, pp. 211-223 although it adopts a simple single parameter un-weighted estimation instead of joint weighted least square estimation. With regard to complexity, the weighting factor calculation adopted by the algorithm described in the publication by Pei-yun Tsai, Hsin-Yu Kang and Tzi-Dar Chiueh, entitled "Joint Weighted Least Squares Estimation of Frequency and Timing Offset for OFDM Systems over Fading Channels", published as IEEE Trans. On Vehicular Technology, Vol. 54, Issue 1, January 2005, pp. 211-223 is avoided. Moreover, in the algorithm described in the publication by Pei-yun Tsai, Hsin-Yu Kang and Tzi-Dar Chiueh, entitled "Joint Weighted Least Squares Estimation of Frequency and Timing Offset for OFDM Systems over Fading Channels", published as IEEE Trans. On Vehicular Technology, Vol. 54, Issue 1, January 2005, pp. 211-223, even the simplified estimator of η still has a high complexity and is not suitable for practical integrated circuit implementation.

By contrast, in the two-dimensional estimator of FIG. 2, the first tier correlation only involves two complex multiplications, then there are a few complex additions for the averaging over one OFDM symbol and multiple receiver chains. Finally, another complex multiplication is required for second tier correlation over two consecutive OFDM symbols. However, its complexity and cost are attractively low, but high accuracy may be achieved as the two-dimensional cross-correlation efficiently removes the influence of carrier frequency offset on sampling frequency offset. Moreover, the first tier correlation is performed on pairs of positive and negative subcarriers, which are half symbol separated. This decreases the influence of SNR variation for different subcarriers in a dispersive fading channel. In addition, the averaging over multiple receiver antennae further improves the accuracy of the estimate.

The above-described estimator shown in FIG. 2 operates on the OFDM symbols after a number ($N_r$) of N-point FFTs where $N_r$ is the number of receiving antennae. In practice, the estimation variance may affected by MIMO fading channels, as shown in Equation (4) above. The estimator shown in FIG. 3 is an alternative estimator to that shown in FIG. 2 which operates on the OFDM symbols after MIMO detection. Namely it operates on y'$_l$(k), $$y'_l(k) = G(k)y(k) = G(k)H(k)x(k) + G(k)n(k) = \quad (6)$$
$$\exp(j\varphi_l(k))x_l(k) + ICT_l(k) + n'_l(k)$$

In the above equation, G(k) is the detection matrix, which can be computed according to zero-forcing (ZF) or minimum mean square error (MMSE) criteria. The detection is performed assuming that G(k)H(k)=I, where I is an identity matrix.

If the above y'$_l$(k) is applied to Equation (4), the estimation performed by the estimator of FIG. 3 may be given by:

$$z_l = \arg\left(C \exp\left(j\frac{2\pi KN_s\eta}{N}\right) + e'_l\right) = \frac{2\pi KN_s\eta}{N} + \xi'_l \quad (7)$$

where C is a constant which is associated with J, $N_r$, and $N_t$, and has no direct relation to the MIMO fading channel. This means that the estimation variance may be significantly reduced.

Thus the alternative estimator shown in FIG. 3 operates on the OFDM symbols after MIMO combination, which substantially removes the significant influence of dispersive fading channel on the estimation variance as shown in Equation (4). Moreover, the estimation accuracy benefits more from the averaging over multiple pilot subcarrier pairs and multi-spatial streams.

Reverting now to the PLL structure shown in FIG. 1, in an effort to obtain an efficient solution to timing recovery, it has been determined that the estimation accuracy is not a unique factor dominating the feedback tracking loop performance. In conventional timing tracking loop designs such as those described in the publications by Baoguo Yang, Khaled Ben Letaief, Roger S. Cheng, and Zhigang Cao, entitled "Timing Recovery for OFDM Transmission", published as IEEE Journal of Selected Areas in Communications, Vol. 18, No. 11, November, 2000, pp. 2278-2291 and Pei-yun Tsai, Hsin-Yu Kang and Tzi-Dar Chiueh, entitled "Joint Weighted Least Squares Estimation of Frequency and Timing Offset for OFDM Systems over Fading Channels", published as IEEE Trans. On Vehicular Technology, Vol. 54, Issue 1, January 2005, pp. 211-223, the estimated error signal is smoothed by a low pass loop filter (LPF) and further accumulated by an accumulator. In this case, the high accuracy offset estimate means a fast acquisition stage and a short time to enter into the locking and tracking stage. However, in the practical implementation, this kind of recovery loop generally takes a long time to enter into the stable state.

The difference between the PLL structure according to one or more preferred embodiments of the present invention and conventional PLLs is that, in the present invention, the estimation output passes through an accumulator first, then is smoothed by a low pass filter and further accumulated by an accumulator. The overall third-order PLL operation may be described by the equation:

$$\frac{\hat{\varphi}_{l+1}}{T_s} = \sum_l \left[\left(\sum_l \hat{\eta}_l\right) \otimes f(l)\right] \quad (8)$$

where $\oplus$ denotes convolution, $T_s$ is one OFDM symbol duration including the guard interval, and $\hat{\varphi}_1$ is the estimated value of phase rotation at l-th symbol duration, $\varphi_1$. f(l) is the impulse response function of the LPF filter, and its system response function is, $$F(Z) = \frac{T_s/u_1}{1 - Z^{-1}} + \frac{u_2}{u_1}.$$

Here $z^{-1}$ is unit delay. $u_1$ and $u_2$ are the constants of the LPF filter, which determine the pass bandwidth and stop bandwidth of the filter.

As the estimation of timing offset η is independent of the carrier frequency offset Δf or ε, only the timing offset need be considered. In this case, the actual phase rotation for the timing phase adjustment at l-th OFDM symbol is, $$\varphi_l = 2\pi(lN_s + N_g)\eta \quad (9)$$

and the estimation phase error is $e_\varphi(l) = \hat{\varphi}_l - \varphi_l$.

The stochastic difference equation (SDE) that represents the dynamic behaviour of the tracking loop may be written as:

$$\eta = -\frac{\Delta e_\varphi(l)}{T_s} + \sum_l \hat{\eta}_l \otimes f(l)$$

where $$\eta = \frac{\varphi_{l+1} - \varphi_l}{T_s}, \Delta e_\varphi(l) = e_\varphi(l+1) - e_\varphi(l).$$

Based on the SDE equation, the third-order PLL loop performance may be analytically evaluated.

In the present invention, as shown in FIG. 1, the timing clock offset discriminator output 13 passes through an accumulator 14 first, then is smoothed by a low pass filter 15 and further accumulated by an accumulator 16. The loop is closed by using the accumulator output $\hat{\phi}_s$ to adjust the FFT window start position 17 and the timing phase 12. The window shift function is expressed as $$w_{sft} = \begin{cases} 1 & \hat{\varphi}_l > \pi \\ -1 & \hat{\varphi}_l < -\pi \\ 0 & \text{otherwise} \end{cases} \quad (10)$$

where 1 means the window shift forward. The timing phase adjustment 12 can be described by the equation:

$$\mod(\hat{\varphi}_l, 2\pi) = \begin{cases} \hat{\varphi}_l - 2\pi & \hat{\varphi}_l > \pi \\ \hat{\varphi}_l + 2\pi & \hat{\varphi}_l < -\pi \\ \hat{\psi}_l & \text{otherwise.} \end{cases} \quad (11)$$

The timing phase adjustment 12 is performed on the received vector $y_l(k)$ to obtain phase updated vector $\hat{y}_l(k)$ for the MIMO detection as described by the equation:

$$\hat{y}_l(k) = \exp\left(j\frac{k \cdot \mod(\hat{\varphi}_l, 2\pi)}{N}\right) y_l(k) \quad (12)$$

In the timing recovery PLL, the estimator output is the residual frequency offset. For example, if the estimated deviation is −2%, then the first two estimation outputs should be 98%η, and 98%(η−98%η)≈2%η. Thus, in a conventional second order PLL, the input of the loop filter is highly dynamic in the initial stage and the low pass loop filter should have a wideband to adapt to these dynamics, which implies a poor loop noise performance and a long acquisition time. This directly results in a poor BER (bit error rate) or PER (packet error rate) performance.

In preferred embodiments of the present invention, as the estimator output is the residual frequency offset Δη̂, its accumulation is the estimate of the original frequency offset η̂, but with a better accuracy in the progress of accumulation. As the estimators according to further preferred embodiments have a high accuracy, the resultant accumulator output enters into the stable state very quickly, and its dynamics are low. This implies that a narrow band LPF with good loop noise performance may be employed and assists in achieving both fast acquisition and stable tracking with lower complexity and cost.

Preferred embodiments of the invention may be verified in a 2×2 MIMO-OFDM based WLAN system. The system specification is referred to the WLAN 802.11n standard draft [see the publication "EWC HT PHY Specification", Enhanced Wireless Consortium Publication. V1.27, Dec. 23, 2005]. A Type B MIMO fading channel model [as described in the publication "IEEE P802.11 Wireless LANs TGn Channel Models", doc.: IEEE 802.11-03/940r4, May 2004] may be employed in the system simulation.

Figure 4A:
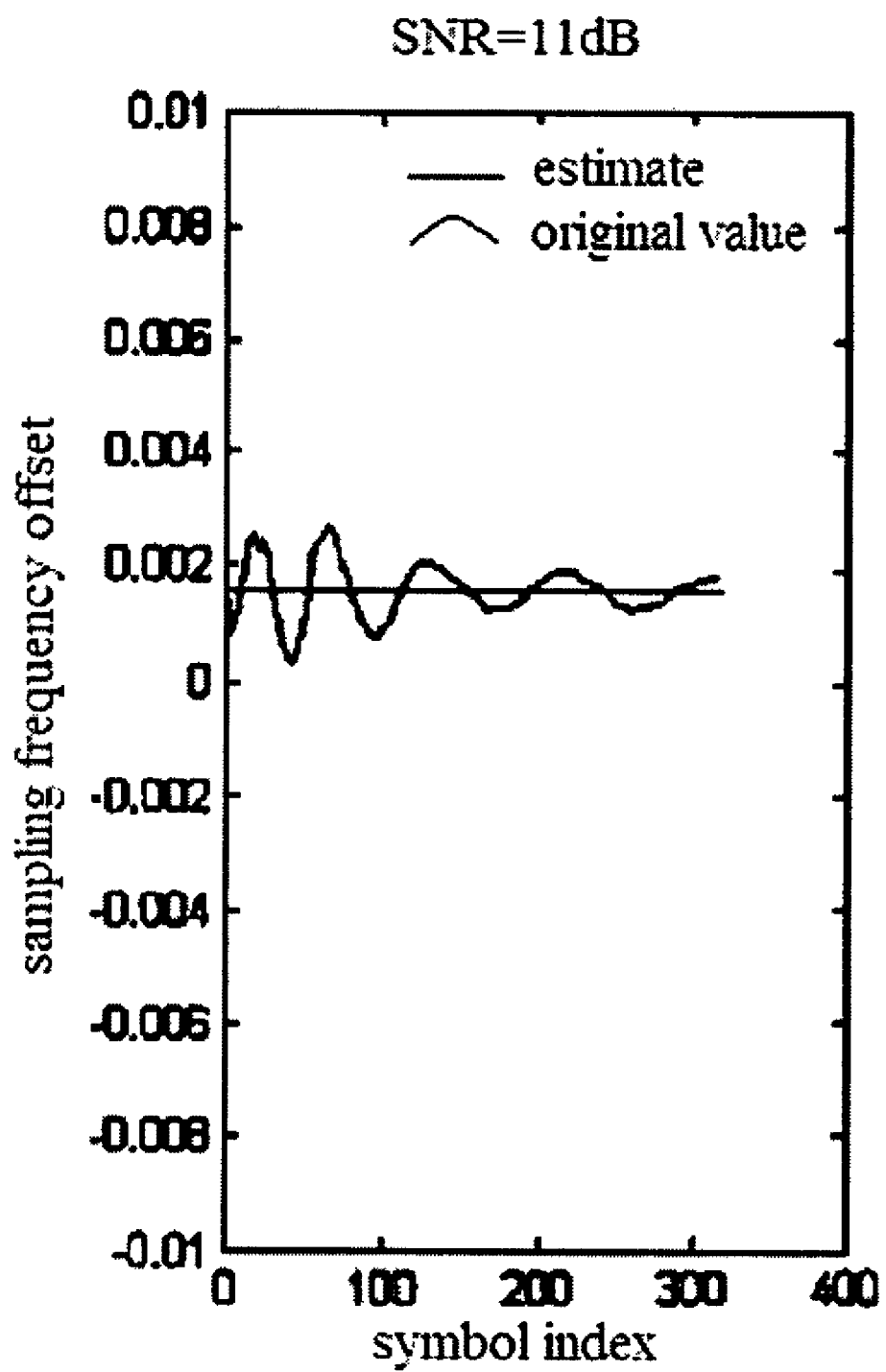
FIG. 4A is a graph showing the variation in sampling frequency offset with symbol index for a third order PLL according to a preferred embodiment of the present invention as the PLL acquires the signal.
Figure 4B:
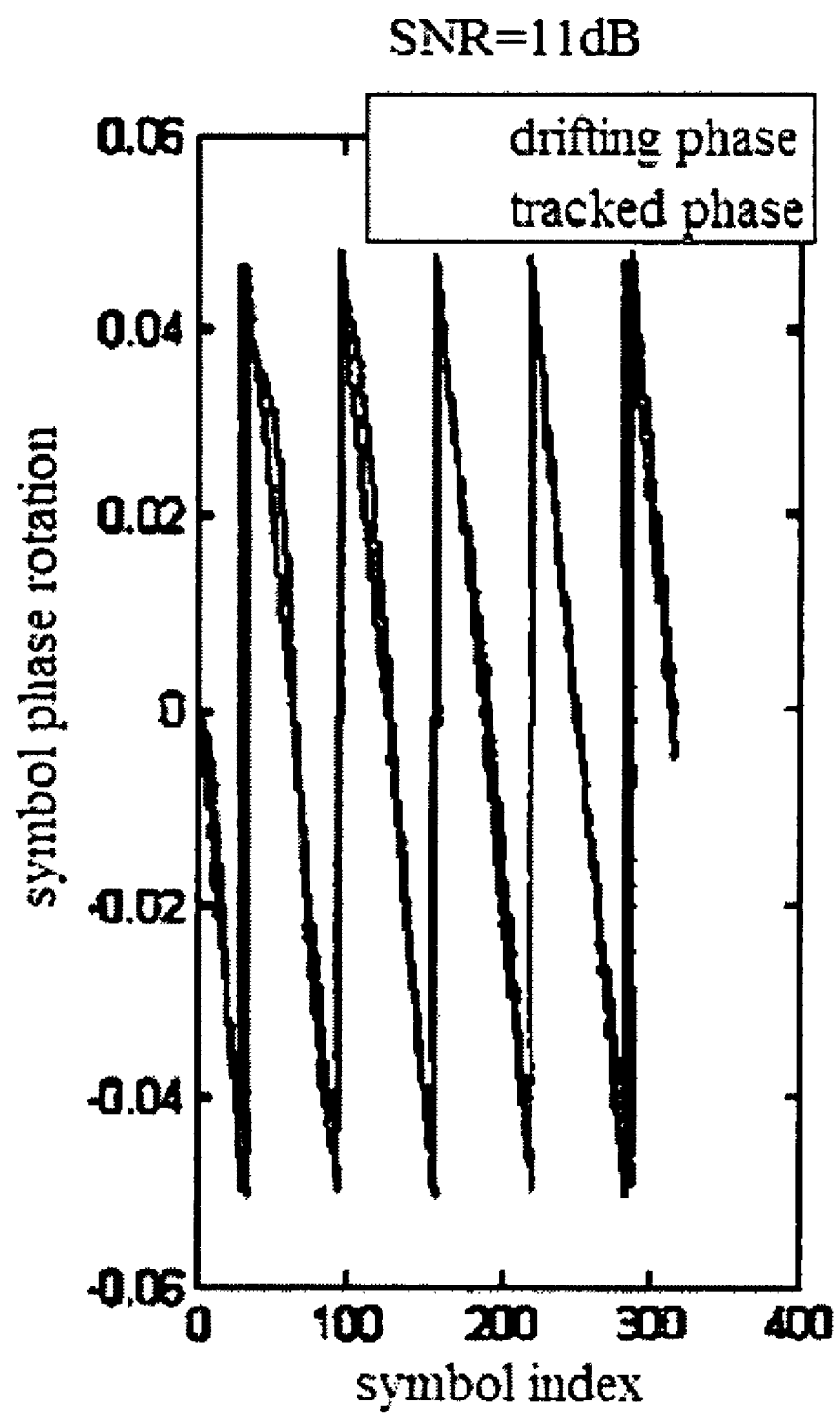
FIG. 4B is a graph showing the variation in symbol phase rotation with symbol index for a third order PLL according to a preferred embodiment of the present invention as the PLL tracks the signal.

FIGS. 4A and 4B are graphs showing the acquisition and tracking behaviour of the third-order PLL of FIG. 1. The acquisition time is the estimation duration, that is, only two OFDM symbols, which is confirmed in FIGS. 4A and 4B. It will be seen that the acquisition and tracking start at the same time and the transition time to stable tracking status is negligible. This substantially decreases the acquisition and tracking error, thus the timing drift may be tracked and regenerated with high accuracy, which implies an excellent system BER and PER performance.

Figure 5A:
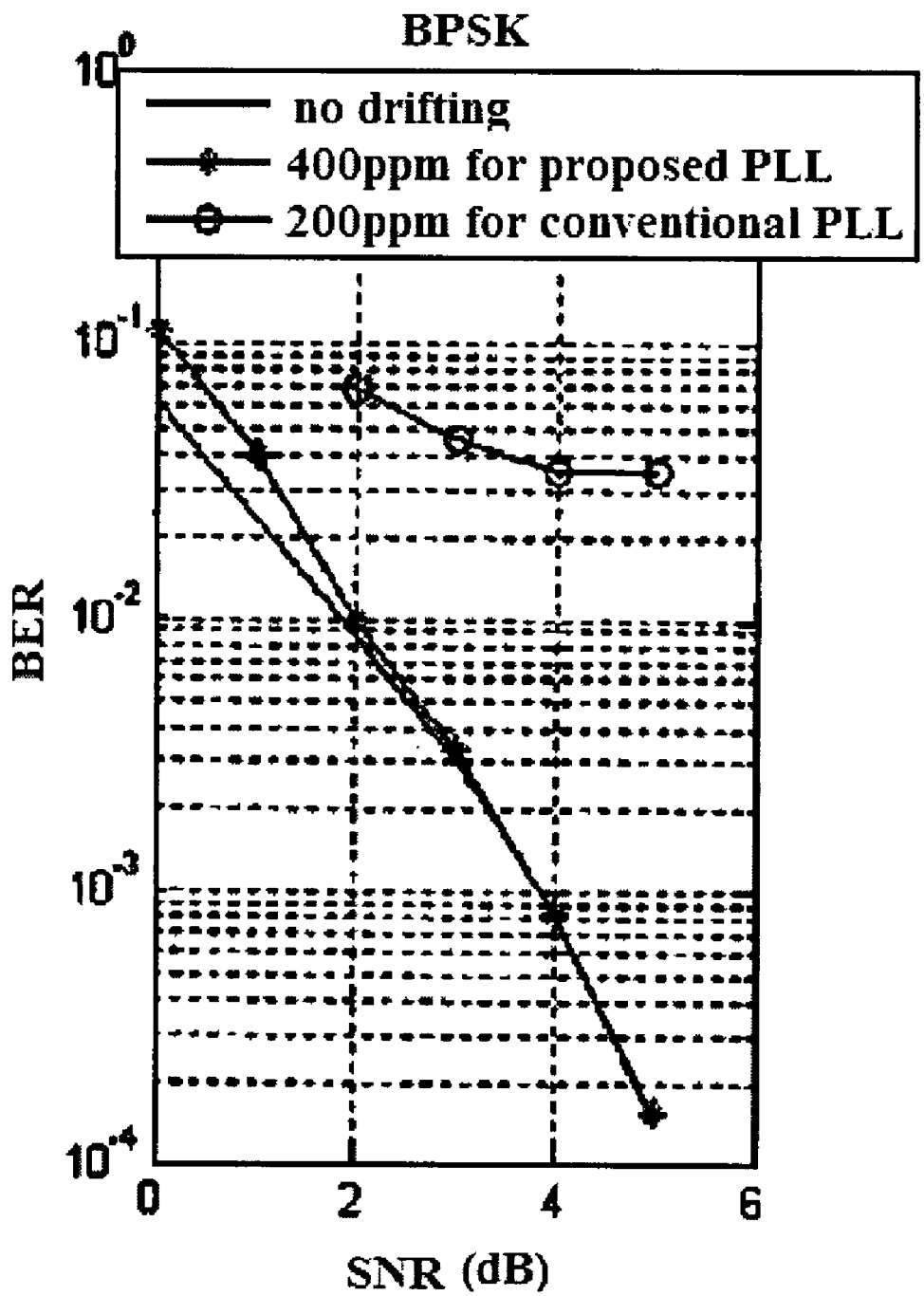
FIG. 5A is a graph showing the variation in BER with SNR for a signal modulated according to a BPSK modulation scheme in an AWGN channel firstly with no drifting, secondly when a PLL according to the present invention is used and thirdly when a conventional PLL has been applied/used in the processing thereof.
Figure 5B:
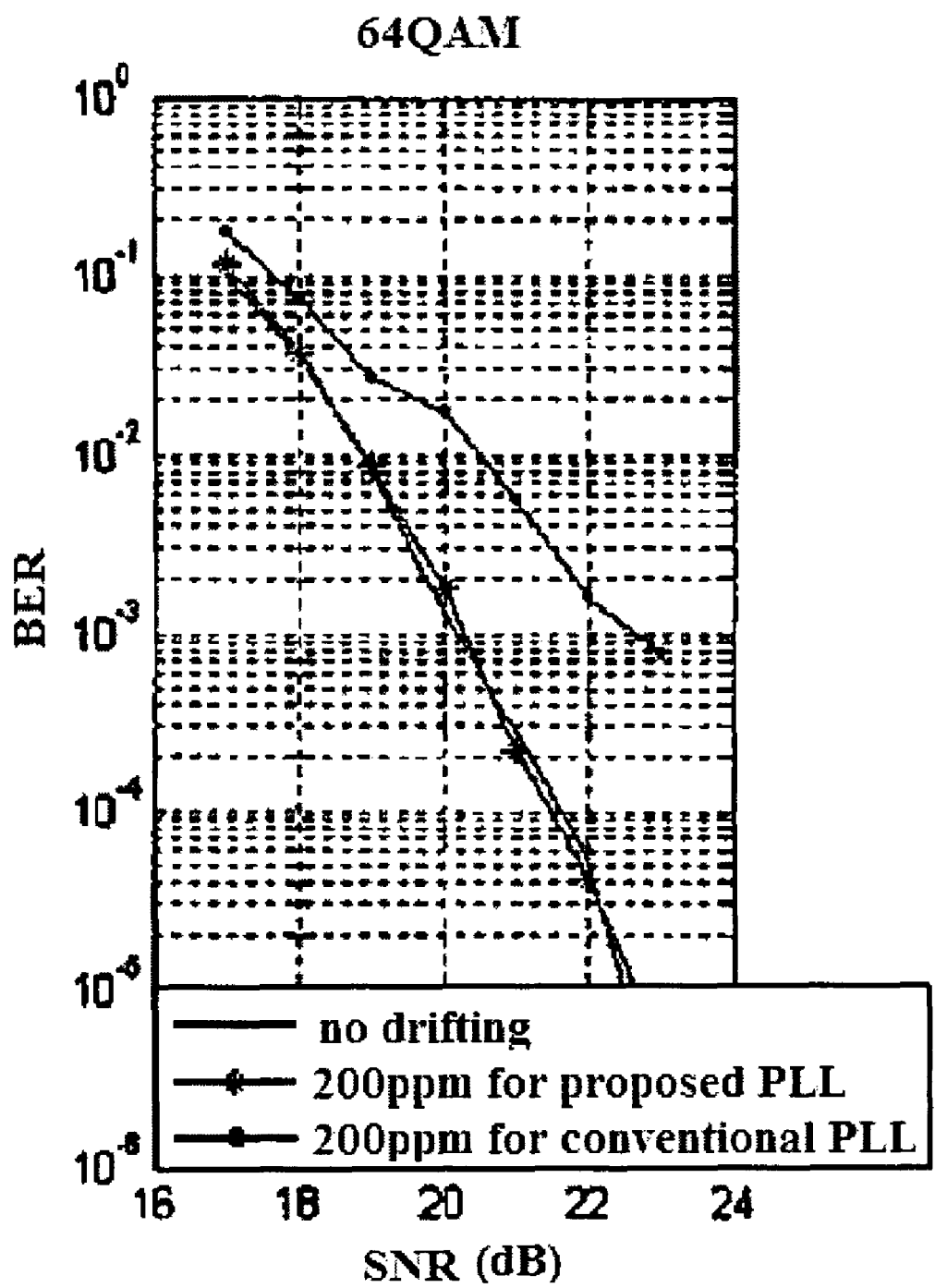
FIG. 5B is a graph showing the variation in BER with SNR for a signal modulated according to a 64 QAM modulation scheme in an AWGN channel firstly with no drifting, secondly when a PLL according to the present invention is used and thirdly when a conventional PLL has been applied/used in the processing thereof.
Figure 6A:
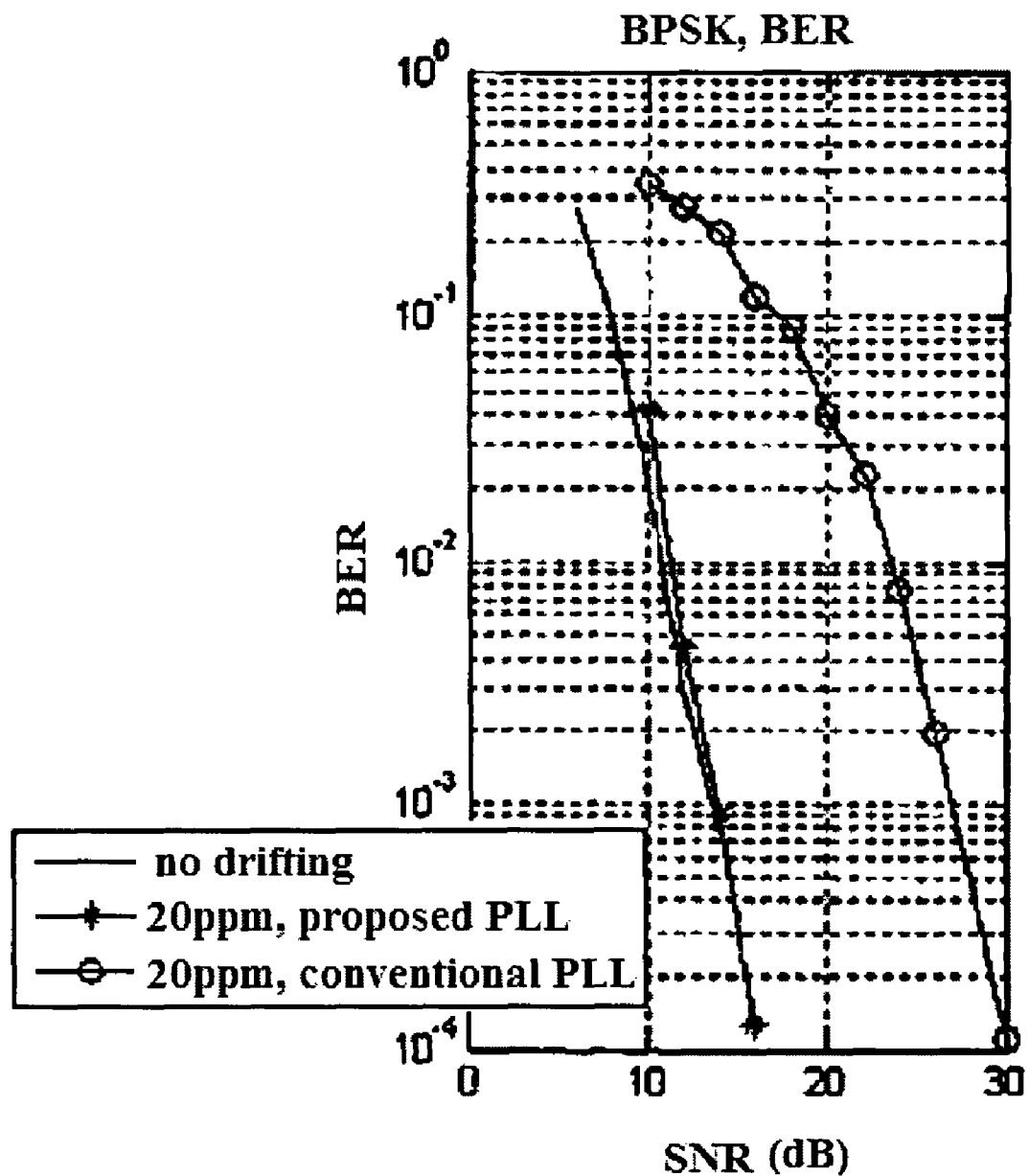
FIG. 6A is a graph showing the variation in BER with SNR for a signal modulated according to a BPSK modulation scheme in a B type channel firstly with no drifting, secondly when a PLL according to the present invention is used and thirdly when a conventional PLL has been applied/used in the processing thereof.
Figure 6B:
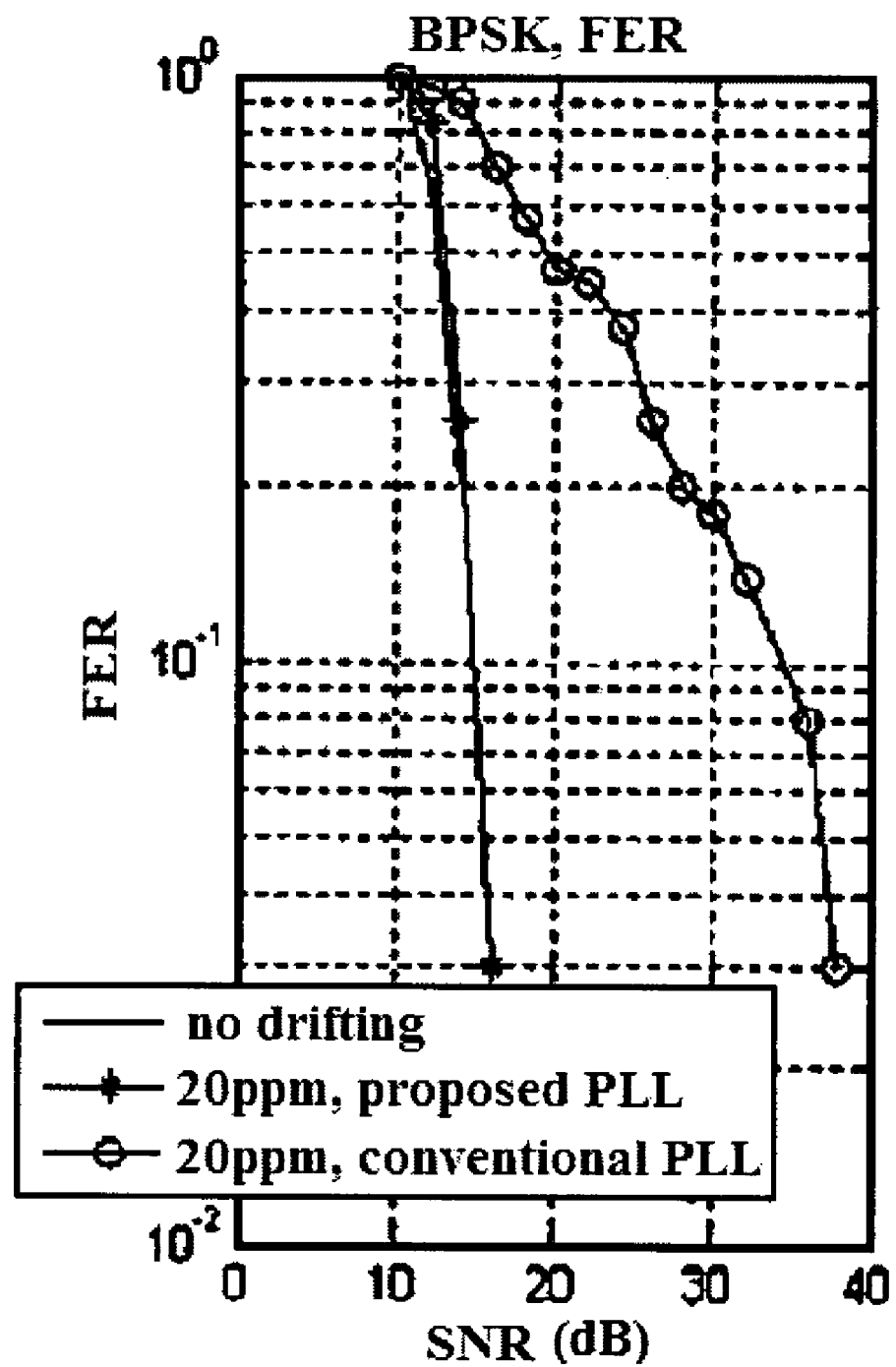
FIG. 6B is a graph showing the variation in FER with SNR for a signal modulated according to a BPSK modulation scheme in a B type channel firstly with no drifting, secondly when a PLL according to the present invention is used and thirdly when a conventional PLL has been applied/used in the processing thereof.
Figure 7A:
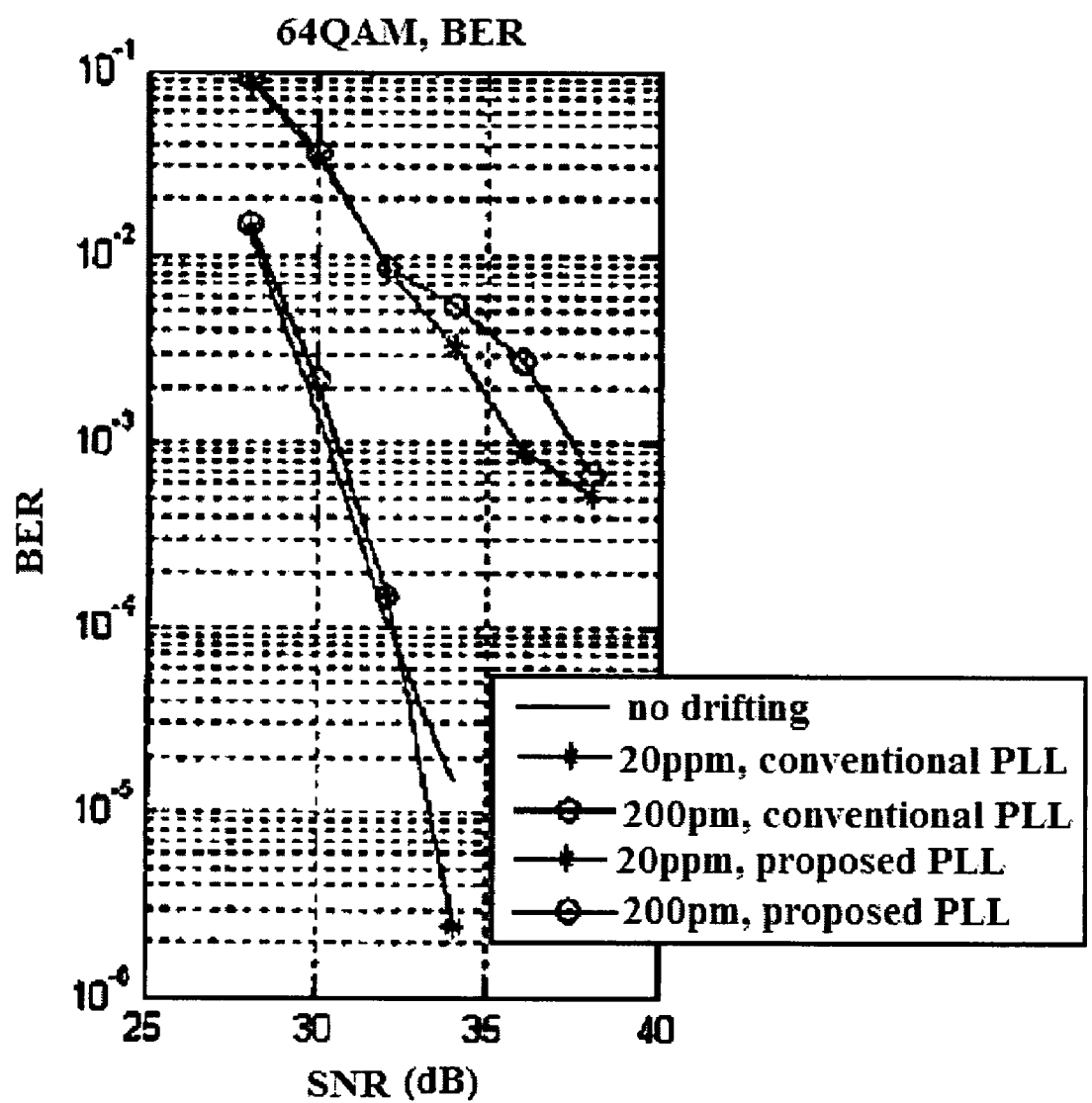
FIG. 7A is a graph showing the variation in BER with SNR for a signal modulated according to a 64QAM modulation scheme in a B type channel firstly with no drifting, secondly when a PLL according to the present invention is used at 20 ppm and 200 ppm and thirdly when a conventional PLL at 20 ppm and 200 ppm has been applied/used in the processing thereof.
Figure 7B:
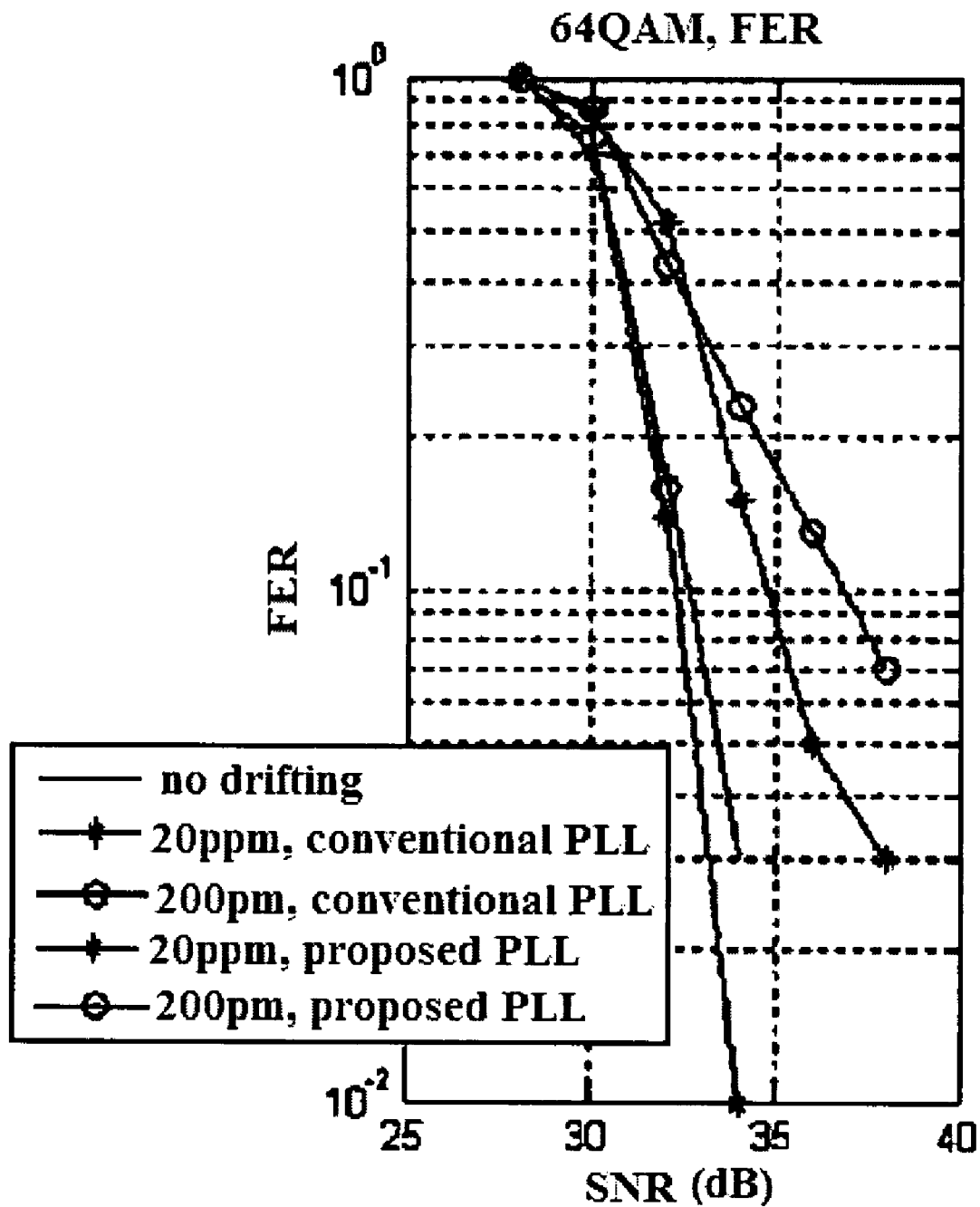
FIG. 7B is a graph showing the variation in FER with SNR for a signal modulated according to a 64QAM modulation scheme in a B type channel firstly with no drifting, secondly when a PLL according to the present invention is used at 20 ppm and 200 ppm and thirdly when a conventional PLL at 20 ppm and 200 ppm has been applied/used in the processing thereof.

The system performance comparison results for two timing recovery schemes are shown in FIGS. 5A to 7B. The system simulation results in an AWGN channel for BPSK and 64QAM modulations are shown in FIGS. 5A and 5B for a packet length of 2048 bytes. It is clear that the third-order PLL of FIG. 1 significantly outperforms the conventional second-order PLL schemes. In the simulation, it was also observed that the phase unlocking occurred frequently for the AWGN channel. In this case the bit errors are not counted in the last BER. Evidently the real BER performance of the traditional PLL schemes should be much worse than the result shown in FIGS. 5A and 5B.

The system simulation results in a MIMO fading channel B for BPSK and 64QAM modulations are shown in FIGS. 6A to 7B respectively for packet lengths of 2048 bytes. The simulation results indicate that the third-order PLL of FIG. 1 out-performs the conventional second-order PLL significantly. Moreover, the PLL of FIG. 1 may support clock inaccuracy up to 200 ppm with negligible system performance degradation, which is much better than the 20 ppm clock inaccuracy requirement specified in the WLAN standard.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the scope of the invention.

The invention claimed is:

1. An apparatus for timing recovery in an OFDM system comprising:
   a third order phase lock loop (PLL) comprising:
   a Fast Fourier Transform (FFT) stage for receiving a number of input signals in the time domain and transforming one or more of the number of input signals to the frequency domain; one or more of the number of input signals having an associated sampling frequency and phase and comprising a number of symbols, the Fast Fourier Transform stage being arranged to apply a Fast Fourier Transform process to one or more of the number of input signals, the Fast Fourier transform process having an associated window of operation;
   a phase rotation stage couplable to an output of the Fast Fourier Transform stage for adjusting the phase of one or more of the one or more transformed signals;
   a frequency offset estimation stage couplable to an output of the phase rotation stage for estimating frequency offset between sampled signals to provide one or more frequency offset estimates;
   a first accumulator couplable to an output of the frequency offset estimation stage for accumulating the one or more frequency offset estimates;
   a low pass filter couplable to an output of the first accumulator for stabilizing the phase lock loop;
   a second accumulator couplable to an output of the low pass filter for accumulating outputs of the low pass filter; the second accumulator being arranged to control phase rotation in the phase rotation stage; and
   a controller stage for controlling timing associated with the window of operation of the Fast Fourier Transform process applied by the Fast Fourier Transform stage, the second accumulator being arranged to control the controller stage;

the phase rotation being arranged to generate a time recovered output signal.

2. An apparatus according to claim 1, wherein the frequency offset estimation stage comprises:

one or more cross-correlation stages for correlating one or more outputs from the one or more phase rotation stages and for providing one or more cross-correlated output signals;

one or more first summation stages for summing the cross-correlated output signals in each antenna channel;

a second summation stage for summing the one or more outputs of the one or more first summation stages;

a further stage for determining an average phase difference between consecutive symbols from an output signal of the second summation stage; and a phase extraction stage couplable to an output of said further stage for extracting the phase of the one or more cross-correlated output signals and to generate an estimated sampling frequency offset.

3. An apparatus according to claim 2, further comprising a MIMO detection stage couplable between the one or more phase rotation stages and the cross-correlation stages in the frequency offset estimation stage.

4. A method of timing recovery in an OFDM system comprising:

applying in a Fast Fourier Transform stage a Fast Fourier Transform process to a number of received input signals in the time domain to transform one or more of the number of input signals to the frequency domain, one or more of the number of input signals having an associated sampling frequency and phase and comprising a number of symbols, the Fast Fourier transform process having an associated window of operation;

adjusting the phase of one or more of the one or more transformed signals in a phase rotation stage couplable to an output of the Fast Fourier Transform stage;

estimating in a frequency offset estimation stage frequency offset between sampled signals to provide one or more frequency offset estimates from an output signal of the phase rotation stage;

accumulating the one or more frequency offset estimates in a first accumulator;

stabilizing the phase lock loop using a low pass filter;

accumulating outputs of the low pass filter in a second accumulator;

controlling the phase rotation in the phase rotation stage using the accumulated outputs of the low pass filter; and controlling timing associated with the window of operation of the Fast Fourier Transform process applied by the Fast Fourier Transform stage using the accumulated outputs of the low pass filter.

5. A method according to claim 4, wherein the step of estimating the frequency offset comprises:

correlating one or more output signals from the one or more phase rotation stages and for providing one or more cross-correlated output signals;

summing in one or more first summation stages the cross-correlated output signals for each antenna;

summing in a second summation stage one or more outputs of the one or more first summation stages and providing an output signal;

determining an average phase difference between consecutive symbols from an output signal from the second summation stage; and extracting the phase of the one or more cross-correlated output signals to generate an estimated sampling frequency offset.

6. A method according to claim 5, further comprising applying the one or more outputs of the one or more phase rotation stages in the frequency offset estimation stage to one or more inputs of a MIMO detection stage prior to the step of correlating the signals in the frequency offset estimation stage.

7. A receiver comprising the apparatus of claim 3.

8. A receiver comprising the apparatus of claim 2.

9. A receiver comprising the apparatus of claim 1.

* * * * *